(12) United States Patent
Alumbaugh et al.

(10) Patent No.: US 7,657,391 B2
(45) Date of Patent: Feb. 2, 2010

(54) ELECTROMAGNETICALLY DETECTING THIN RESISTIVE BODIES IN SHALLOW WATER AND TERRESTRIAL ENVIRONMENTS

(75) Inventors: David Alumbaugh, Berkeley, CA (US); Jiuping Chen, Albany, CA (US); Frank Morrison, Berkeley, CA (US)

(73) Assignee: WesternGeco L.L.C., Houston, TX (US)

( * ) Notice: Subject to any disclaimer, the term of this patent is extended or adjusted under 35 U.S.C. 154(b) by 265 days.

(21) Appl. No.: 11/457,623

(22) Filed: Jul. 14, 2006

(65) Prior Publication Data

US 2008/0015779 A1 Jan. 17, 2008

(51) Int. Cl.
*G01V 3/00* (2006.01)
*G06F 19/00* (2006.01)

(52) U.S. Cl. .................................... 702/127
(58) Field of Classification Search ................ 702/127, 702/11–13, 38, 115; 175/50; 324/200, 331, 324/345, 348
See application file for complete search history.

(56) References Cited

U.S. PATENT DOCUMENTS

| | | | |
|---|---|---|---|
| 2,652,530 A | 9/1953 | Davidson | |
| 3,052,836 A | 9/1962 | Postma | |
| 3,108,220 A | 10/1963 | Ruddock | |
| 3,324,385 A | 6/1967 | Hings | |
| 3,351,936 A | 11/1967 | Feder | |
| 4,617,518 A | 10/1986 | Srnka | |
| 4,633,182 A | 12/1986 | Dzwinel | |
| 7,042,801 B1 | 5/2006 | Berg | |
| 7,109,717 B2 | 9/2006 | Constable | |
| 7,126,338 B2 * | 10/2006 | MacGregor et al. | 324/334 |
| 7,245,560 B2 | 7/2007 | Berg | |
| 7,337,064 B2 * | 2/2008 | MacGregor et al. | 702/2 |
| 7,359,282 B2 * | 4/2008 | Tulett | 367/23 |
| 7,362,101 B2 * | 4/2008 | Muftuler et al. | 324/318 |
| 7,362,102 B2 * | 4/2008 | Andreis | 324/365 |

(Continued)

FOREIGN PATENT DOCUMENTS

GB 2070345 9/1981

(Continued)

OTHER PUBLICATIONS

Bannister, P.R., New Simplified Formulas for ELF Subsurface-to-Subsurface Propagation, IEEE Journal of Oceanic Engineering, vol. OE-9, No. 3, Jul. 1984, pp. 154-163.

(Continued)

*Primary Examiner*—Michael P. Nghiem
*Assistant Examiner*—Cindy H Khuu
(74) *Attorney, Agent, or Firm*—Fred G. Pruner; Liangang (Mark) Ye; Jeffrey Griffin

(57) ABSTRACT

A technique includes performing first electromagnetic field measurements to obtain a first set of data and performing second electromagnetic field measurements to obtain a second set of data. The first set of data is relatively sensitive to an effect caused by an air layer boundary and is relatively insensitive to the presence of a resistive body. The second set of data is relatively insensitive to the effect and is relatively sensitive to the presence of the resistive body. The technique includes combining the first and second sets of data to generate a third set of data, which is relatively insensitive to the effect and is relatively sensitive to the presence of the resistive body.

19 Claims, 9 Drawing Sheets

U.S. PATENT DOCUMENTS

| | | | |
|---|---|---|---|
| 7,430,474 | B2 | 9/2008 | van den Berg et al. |
| 7,456,632 | B2 | 11/2008 | Johnstad et al. |
| 2005/0077902 | A1* | 4/2005 | MacGregor et al. ......... 324/334 |
| 2006/0038570 | A1 | 2/2006 | Constable |
| 2006/0129322 | A1* | 6/2006 | MacGregor et al. ........... 702/13 |
| 2006/0255809 | A1 | 11/2006 | Johnstad et al. |
| 2007/0150201 | A1* | 6/2007 | Eidesmo et al. ............... 702/13 |
| 2008/0002522 | A1 | 1/2008 | Berg |
| 2008/0015809 | A1 | 1/2008 | Alumbaugh et al. |
| 2008/0016817 | A1 | 1/2008 | Zeigler |
| 2008/0061790 | A1 | 3/2008 | Strack |
| 2008/0091356 | A1 | 4/2008 | Alumbaugh et al. |
| 2008/0103700 | A1 | 5/2008 | van den Berg et al. |
| 2008/0150538 | A1 | 6/2008 | Andreis |

FOREIGN PATENT DOCUMENTS

| | | | |
|---|---|---|---|
| GB | 2378511 | A1 | 2/2003 |
| GB | 2 411 006 | | 8/2005 |
| GB | 2423370 | * | 8/2006 |
| WO | WO0100467 | | 1/2001 |
| WO | WO0214906 | | 2/2002 |
| WO | WO 03/100467 | | 12/2003 |
| WO | WO2004109338 | | 12/2004 |
| WO | WO2005010560 | | 2/2005 |

OTHER PUBLICATIONS

Boerner, David E. et al., Orthogonality in CSAMT and MT Measurements, Geophysics, vol. 58, No. 7, Jul. 1993, pp. 924-934.
Chave, Alan D. et al., Controlled Electromagnetic Sources for Measuring Electrical Conductivity Beneath the Oceans, Journal of Geophysical Research, vol. 87, No. B7, pp. 5327-5338, Jul. 10, 1982.
Chave, Alan D. et al., Electrical Exploration Methods in Applied Geophysics vol. 2, Electrical Exploration Methods for the Seafloor, Chapter 12, 1991, pp. 931-966.
Constable, S. et al., Marine Controlled-Source Electromagnetic Sounding, Journal of Geophysical Research, vol. 101, No. B3, Mar. 10, 1996, pp. 5519-5530.
Constable, S. et al., Occam's Inversion: A Practical Algorithm for Generating Smooth Models from Electromagnetic Sounding Data, Geophysics, vol. 52, No. 3, Mar. 1987, pp. 289-300.
Edwards, R. Nigel, On the Resource Evaluation of Marine Gas Hydrate Deposits Using Sea-Floor Transient Electric Dipole-Dipole Methods, Geophysics vol. 62, No. 1, Jan.-Feb. 1997, pp. 63-74.
Edwards, R.N., Controlled Source Electromagnetic Mapping of the Crust, Encyclopedia of Solid Earth Geopyics, ed. James D. Van Nostrand Reinhold, New York, 1989, pp. 127-138.
Edwards R.N. et al., Electromagnetic Assessment of Offshore Methane Hydrate Deposits on the Cascadia Margin, American Geophyiscal Union Fall Meeting, San Francisco, 1998, pp. 363-375.
Evans, Rob L. et al., On the Electrical Nature of the Axial Melt Zone at 13 Degrees N on the East Pacific Rise, Journal of Geophysical Research, vol. 99, No. B1, Jan. 10, 1994, pp. 577-588.
Flosadottir, A. et al., Marine Controlled-Source Electromagnetic Sounding, Journal of Geophysical Research, vol. 101, No. B3, Mar. 10, 1996, pp. 5507-5517.
U.S. Dept. of Energy Office of Basic Energy Sciences, Division of Engineering and Geosciences, Two and Three-Dimensional Magnetotelluric Inversion, Technical Report: Dec. 1, 1991-May 31, 1994.
Kvenvolden, K. et al., A Primer on the Geological Occurrence of Gas Hydrate, Gas Hydrates: Relevance to World Margin Stability and Climate Change, Geological Society, London, Special Publications, 137, 9-30.
MacGregor, L. et al., The RAMESSES Experiment—III. Controlled-Source Electromagnetic Sounding of the Reykjanes Ridge . . . , Geophys. J. Int. 1998, 135, pp. 773-789.
MacGregor, L. et al., Use of Marine Controlled Source Electromagnetic Sounding for Sub-Basalt Exploration, EAGE 61st Conference and Technical Exhibition, Helsinki, Finland, Jun. 7-11, 1999.
Nekut, A. et al., Petroleum Exploration Using Controlled-Source Electromagnetic Methods, Proceedings of the IEEE, vol. 77, No. 2, Feb. 1989.
Sinha, M. C. et al., Evidence for Accumulated Melt Beneath the Slow-Spreading Mid-Atlantic Ridge, Phil. Trans. R. Soc. Land. A, 355, 1997, pp. 233-253.
Sinha, Martin, Controlled Source EM Sounding: Survey Design Considerations for Hydrocarbon Applications, LITHOS Science Report Apr. 1999, 95-101.
Sinha, M. et al., An Active Source Electromagnetic Sounding System for Marine Use, Marine Geophysical Researches 1990, 12: 59-68.
Strack, K. et al., Integrating Long-Offset Transient Electromagnetic (LOTEM) with Seismics in an Exploration Environment, Geophysical Prospecting, 1996, 44, 997-1017.
Tseng, H. et al., A Borehole-to-Surface Electromagnetic Survey, Geophysics vol. 63, No. 5, pp. 1565-1572.
Das, Umesh C., Apparent Resistivity Curves in Controlled-Source Electromagnetic Sounding Directly Reflecting True Resistivities in a Layered Earth, Geophysics vol. 60, No. 1, Jan.-Feb. 1995, pp. 53-60.
Das, Umesh C., Frequency- and Time-Domain Electromagnetic Responses of Layered Earth—A Multiseparation, Multisystem Approach, Geophysics vol. 60, No. 1, Jan.-Feb. 1995, pp. 285-290.
Thompson, Arthur H. et al., U.S. Statutory Invention Registration H1490, Sep. 5, 1995.
Walker, Peter W. et al., Parametric Estimators for Current Excitation on a Thin Plate, Geophysics vol. 57, No. 6, Jun. 1992, pp. 766-773.
Ward, S.H. et al., Electromagnetic Theory for Geophysical Applications, in Investigations in Geophysics: Electromagnetic Methods in Applied Geophysics, ed. Nabighian, Society of Exploration Geophysicists, Oklahoma, 1988.
Yuan, J. et al., The Assessment of Marine Gas Hydrates through Electrical Remote Sounding: Hydrate without a BSR?, Geophysical Research Letters, vol. 27, Aug. 2000, pp. 2397-2400.
Yuan, Edwards et al., Electromagnetic Assessment of Offshore Methane Hydrate Deposits on the Cascadia Margin, MARELEC 1999.
Office Action from U.S. Appl. No. 11/779,440 dated May 29, 2008.
Office Action from U.S. Appl. No. 11/779,440 dated Nov. 18, 2008.
Kearey, Philip, The Encyclopedia of the Solid Earth Sciences, Blackwell Scientific Publications, 1993. (Cite # 9 on IDS filed Jun. 22, 2007).
Grant, I.S. et al., "Electromagnetism, Second Edition", John Wiley & Sons, 1991. (Cite # 13 on IDS filed Jun. 22, 2007).
Kaufman, A. et al., Methods in Geochemistry and Geophysics, 16., 1983. (Cite # 14 on IDS filed Jun. 22, 2007).
Maurer, Hansruedi et al., Optimized Design of Geophysical Experiments, SEG Paper, 1997. (Cite # 31 on IDS filed Jun. 22, 2007).
Grant, I.S. et al., "Electromagnetism, Second Edition", .Chapter 11: "Electromagnetic Waves", pp. 365-407, John Wiley & Sons, 1991. (Cite # 32 on IDS filed Jun. 22, 2007).
International Search Report, dated Sep. 4, 2009, for PCT/US2008/070209.
Office Action from U.S. Appl. No. 11/779,440 dated Jun. 22, 2009.

* cited by examiner

FIG. 7

MEASUREMENT PARAMETERS

| SOURCE DIPOLE MOMENT (Am) | FREQUENCY (Hz) | SOURCE HEIGHT ABOVE SEAFLOOR (m) | RECEIVER DEPTH |
|---|---|---|---|
| UNITY | 0.1 | 15 | 30m |

MODEL PARAMETERS

| | WATER LAYER | | | OVER BURDEN LAYER | | | RESISTIVE LAYER | | | HALFSPACE | |
|---|---|---|---|---|---|---|---|---|---|---|---|
| σ (S/m) | THICKNESS (m) | DEPTH (m) | σ (S/m) | THICKNESS (m) | DEPTH (m) | σ (S/m) | THICKNESS (m) | DEPTH (m) | σ (S/m) | THICKNESS (m) | DEPTH (m) |
| 3.33 | 30 | 0 | 1.43 | 2000 | 30 | 0.05 | 100 | 2030 | 1.43 | ∞ | 2130 |

FIG. 10

MEASUREMENT PARAMETERS

| SOURCE DIPOLE MOMENT (Am) | FREQUENCY (Hz) | SOURCE DEPTH | RECEIVER DEPTH |
|---|---|---|---|
| UNITY | 0.8 | 0m | 0m |

MODEL PARAMETERS

| OVER BURDEN LAYER | | | RESISTIVE LAYER | | | HALFSPACE | |
|---|---|---|---|---|---|---|---|
| σ (S/m) | THICKNESS (m) | DEPTH (m) | σ (S/m) | THICKNESS (m) | DEPTH (m) | σ (S/m) | THICKNESS (m) | DEPTH (m) |
| .2 | 2000 | 0 | 0.01 | 100 | 2000 | .2 | ∞ | 2100 |

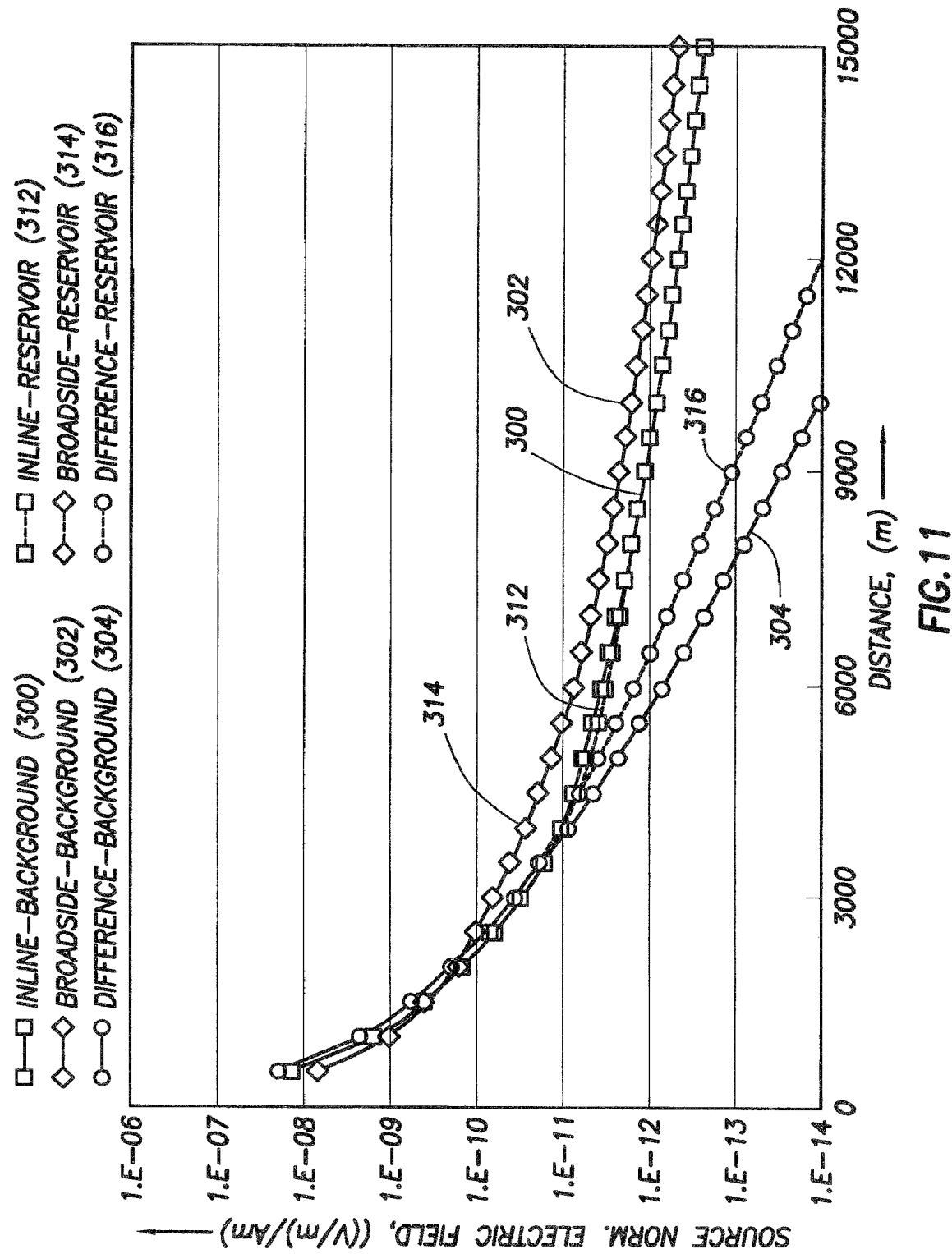

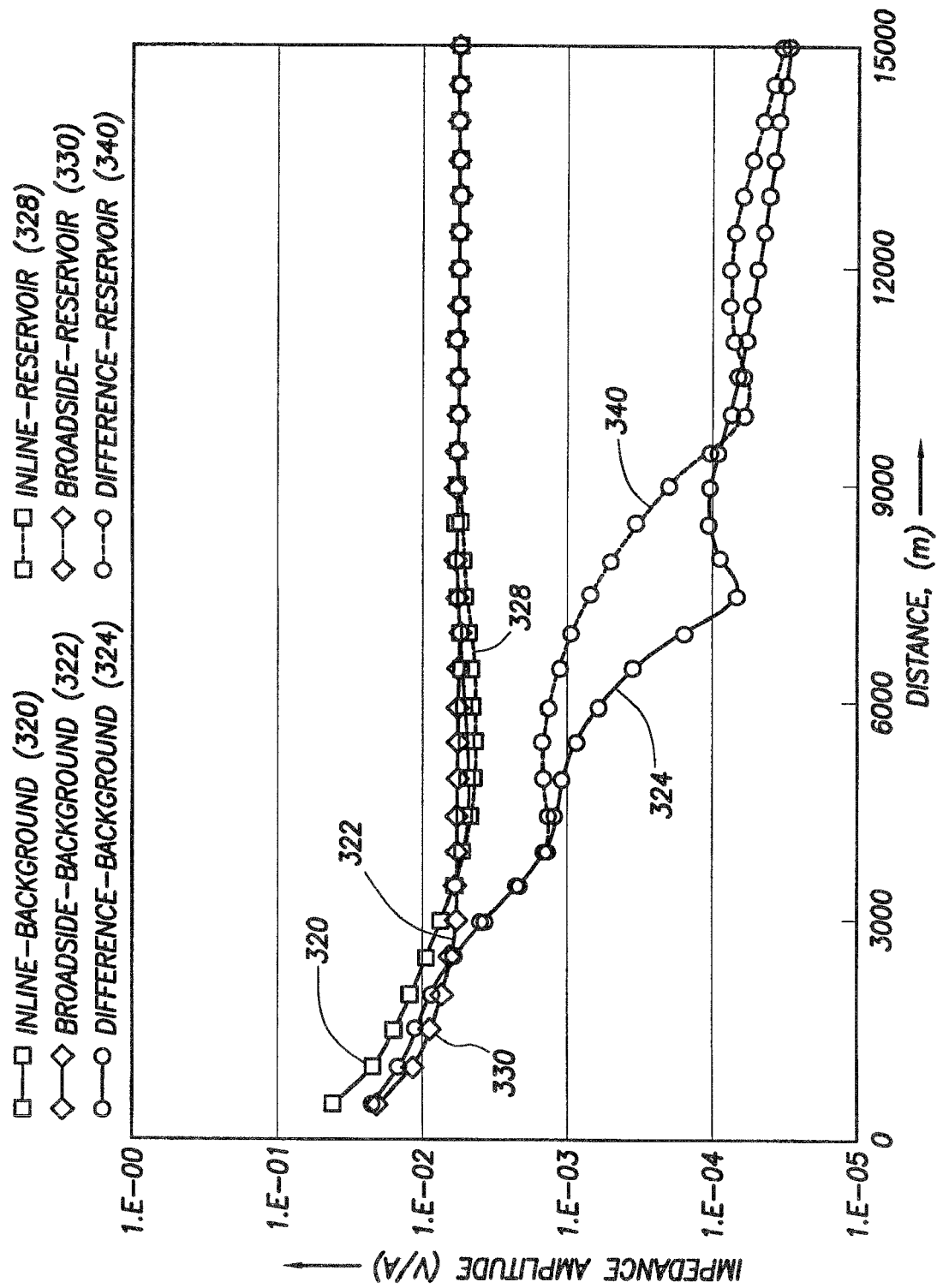

ELECTROMAGNETICALLY DETECTING THIN RESISTIVE BODIES IN SHALLOW WATER AND TERRESTRIAL ENVIRONMENTS

BACKGROUND

The invention generally relates to electromagnetically detecting thin resistive bodies in shallow water and terrestrial environments.

One technique to locate an oil reservoir beneath the sea floor is to measure electromagnetic fields that are produced by a controlled electromagnetic source. More specifically, in a technique called controlled source electromagnetic (CSEM) surveying, an electrical dipole (i.e., a controlled electromagnetic source) may be towed by a surface vessel a short distance above the sea floor. Measurements of the resulting electric and/or magnetic fields are then measured using receivers, which may be deployed, for example, on the sea floor. Ideally, the presence of a thin resistive layer, such as an oil reservoir, affects the measured electric and magnetic fields in a way that can be detected from the measured data.

CSEM surveying typically is limited to deep water, as a phenomenon called an "air wave effect" (as referred to in the literature) currently limits the use of CSEM surveying in shallow water environments. More specifically, the electromagnetic fields that are produced by the electric dipole interact with the air-sea interface to generate electromagnetic energy, or "air waves," which diffuse from the sea surface down to the receiver. For shallow water, the air waves dominate the measured electromagnetic data so that the presence of a thin resistive body may not be readily discernible from the data. Similar challenges limit the application of CSEM surveying to terrestrial environments.

Thus, there is a continuing need for better ways to process data that is generated by controlled source electromagnetic surveying in shallow water and terrestrial environments.

SUMMARY

In an embodiment of the invention, a technique includes performing first electromagnetic field measurements to obtain a first set of data and performing second electromagnetic field measurements to obtain a second set of data. The first set of data is relatively sensitive to an effect caused by an air layer boundary and is relatively insensitive to the presence of a resistive body. The second set of data is relatively sensitive to the effect and is relatively sensitive to the presence of the resistive body. The technique includes combining the first and second sets of data to generate a third set of data, which is relatively insensitive to the effect and is relatively sensitive to the presence of the resistive body.

Advantages and other features of the invention will become apparent from the following drawing, description and claims.

BRIEF DESCRIPTION OF THE DRAWINGS

FIG. 7 is a table depicting a summary of marine model, source and receiver parameters of an exemplary survey according to an embodiment of the invention.

FIG. 10 is a table summarizing a land model, source and receiver parameters of an exemplary terrestrial crosshole electromagnetic survey according to an embodiments of the invention.

FIG. 11 depicts electric fields obtained in connection with the survey summarized in FIG. 10 according to an embodiment of the invention.

FIG. 12 depicts impedances obtained in connection with the survey summarized in FIG. 10 according to an embodiment of the invention.

DETAILED DESCRIPTION

Figure 1:
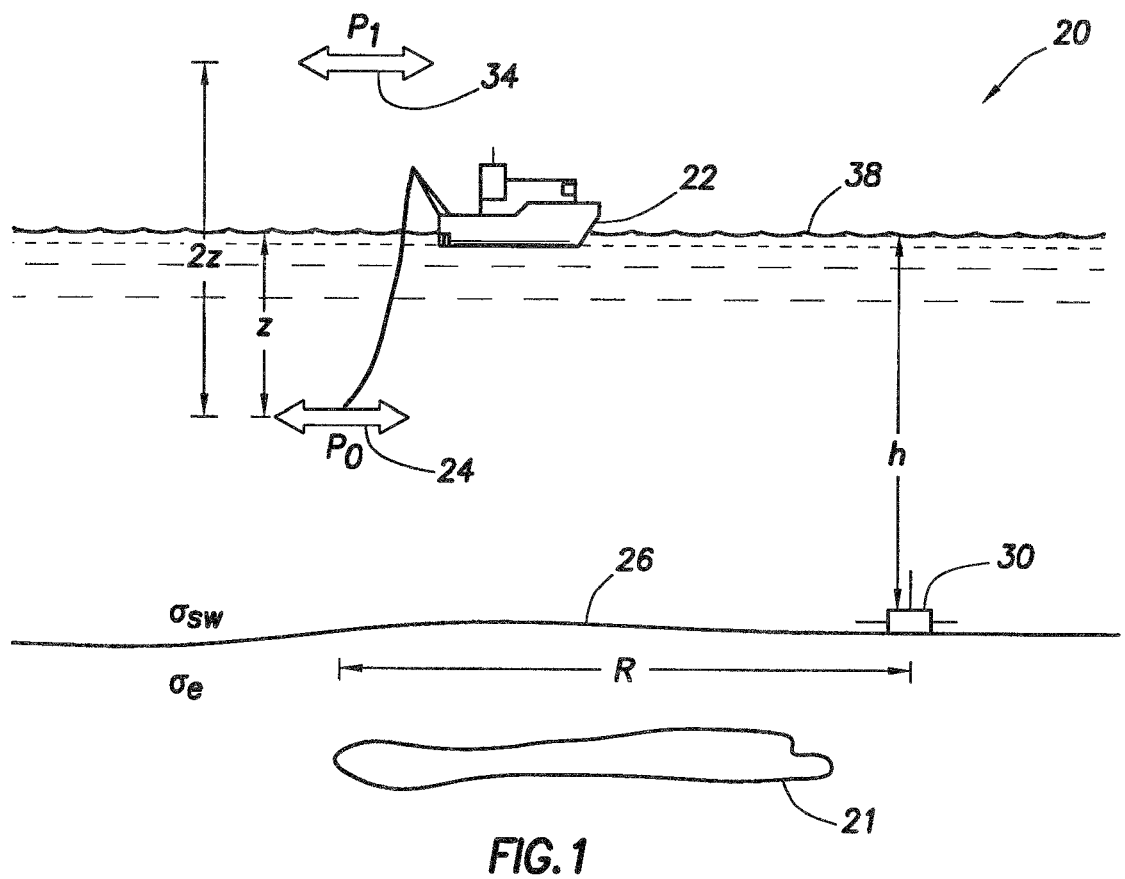
FIG. 1 is an illustration of a system for obtaining controlled source electromagnetic field measurements according to an embodiment of the invention.

In accordance with some embodiments of the invention, a system 20 that is depicted in FIG. 1 may be used for purposes of performing a controlled source electromagnetic (CSEM) survey in relatively shallow water. The survey is useful for locating a thin resistive body, such as the exemplary resistive body 21 that is depicted in FIG. 1. The survey uses a controlled towed electromagnetic dipole 24, which may be towed from a surface ship 22, for example. In general, the electric dipole 24 generates electromagnetic fields, which are measured using receivers 30 (one receiver 30 being depicted in FIG. 1) that are located on a seabed floor 26. The resistive body 21 generally produces stronger electric fields with increasing source-receiver offset than if the resistive body is absent. Thus, the electric field that is measured via the CSEM survey may be used as an indicator for purposes of locating thin resistive bodies, such as hydrocarbon reservoirs, gas reservoirs, water aquifers, etc.

A potential challenge associated with CSEM surveying is that relatively shallow water may produce an air wave effect due to a boundary between the sea surface 38 and the air. A similar effect exists when the CSEM survey is conducted in a terrestrial environment. To desensitize the measured data to the air wave effect, in accordance with some embodiments of the invention described herein, two sets of measurements are collected using different survey configurations. These measurements are then combined to produce a set of measurement data, which is relatively insensitive to the air wave effect.

Figures 2, 5:
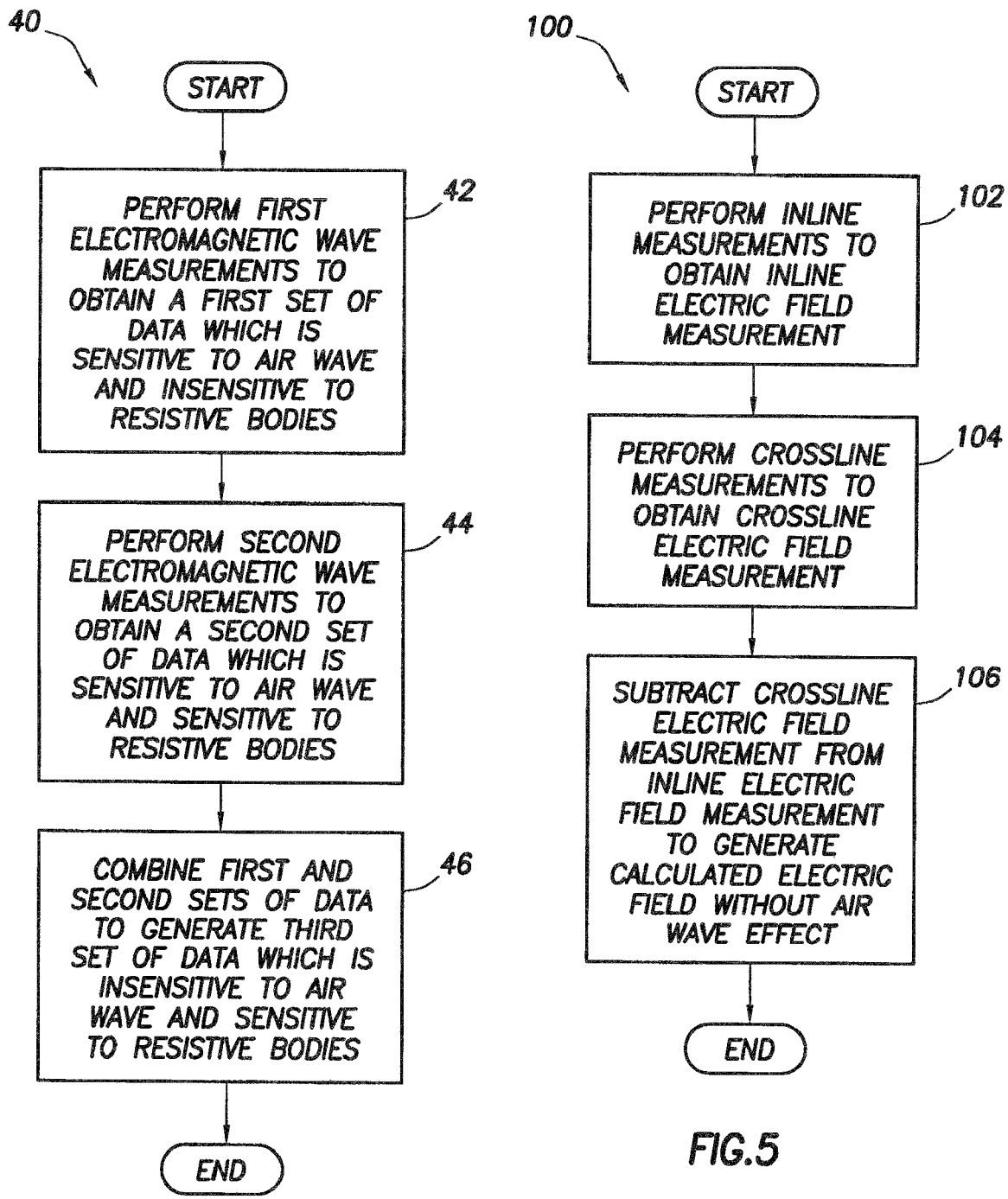
FIGS. 2, 5 and 6 are flow diagrams depicting techniques to desensitize controlled source electromagnetic survey data to the air wave effect according to embodiments of the invention.

More specifically, referring to FIG. 2, in accordance with some embodiments of the invention, a CSEM survey technique 40 includes performing first electromagnetic field measurements to obtain a first set of data, which is relatively sensitive to the air wave effect and is relatively insensitive to resistive bodies, pursuant to block 42. Next, pursuant to the technique 40, second electromagnetic field measurements are performed (block 44) to obtain a second set of data, which is relatively sensitive to the air wave effect and is also relatively sensitive to resistive bodies. Thus, both sets of measurements are sensitive to the air wave effect, and only the second set of data is sensitive to resistive bodies.

Because both sets of measurements are sensitive to the air wave effect, the first and second sets of data may be combined (block 46) in a way that effectively cancels out the air wave effect. This combination, described further below, generates a third set of data, which is insensitive to the air wave effect and is sensitive to resistive bodies. Thus, measurement-based data is created, which has an enhanced sensitivity to the resistive bodies.

Referring back to FIG. 1, to perform a CSEM survey, the electric dipole 24 is towed at a depth z below the sea surface 38. A particular receiver, such as the depicted receiver 30, may be located at a depth h below the sea surface 38 and may be separated from the electric dipole 24 by a distance R. Given the parameters described above, the electric and magnetic fields at the receiver may be approximately expressed as follows:

$$E, H \cong P_0 + P_1 + L, \quad \text{Eq. 1}$$

where "$P_0$" represents a direct wave response at the receiver, which is produced by the electric dipole 24. It is assumed that the direct wave is produced in a medium of uniform conductivity, corresponding to that of the earth. Here, the sea water has a uniform conductivity of "$\sigma_{sw}$," and "$P_1$" represents a modified image term, which is conceptually generated by a second electric dipole source also located in a earth of uniform conductivity but is positioned a distance approximately equal to 2z above the true electric dipole source 24. The term "L" in Eq. 1 represents the air effect, or the lateral electromagnetic field, which is attenuated as it travels straight upward from the source to the air-sea water interface, travels laterally along the interface with the amplitude decreasing only through geometrical spreading and then is attenuated as it travels down from the air-sea water interface to the receiver 30. Thus, the component "L" in Eq. 1 represents the air wave effect, which may dominate and thus obscure, the measured electric or magnetic fields, if not for the techniques that are discussed herein.

For purposes of removing the air wave effect from the measured data (or at least substantially diminishing the impact of the air wave effect), in accordance with some embodiments of the invention, two sets of electromagnetic field measurements that derived with different polarizations are combined. More specifically, in accordance with some embodiments of the invention, two CSEM surveys are performed using two different survey configurations: an inline survey configuration in which the electric dipole 24 is in line with the receiver 30 (and other such receivers 30); and a broadside, or crossline, survey configuration in which the electric dipole 24 is orthogonal with respect to the orientation of the receiver 30 (and other such receivers 30). As described further below, the inline survey configuration is relatively sensitive both to resistive bodies and to the air wave effect, while the crossline survey configuration is also relatively sensitive to the air wave effect but is relatively insensitive to resistive bodies. Therefore, in accordance with some embodiments of the invention, the electric fields (or alternatively, the magnetic fields, if magnetic field measurements are used) that are measured via the crossline configuration are subtracted from the electric fields that are measured via the inline configuration to derive electric fields that are relatively more sensitive to the resistive bodies and relatively less sensitive to the air wave effect (as compared to the electric fields derived from the inline or crossline configuration only).

Figure 3:
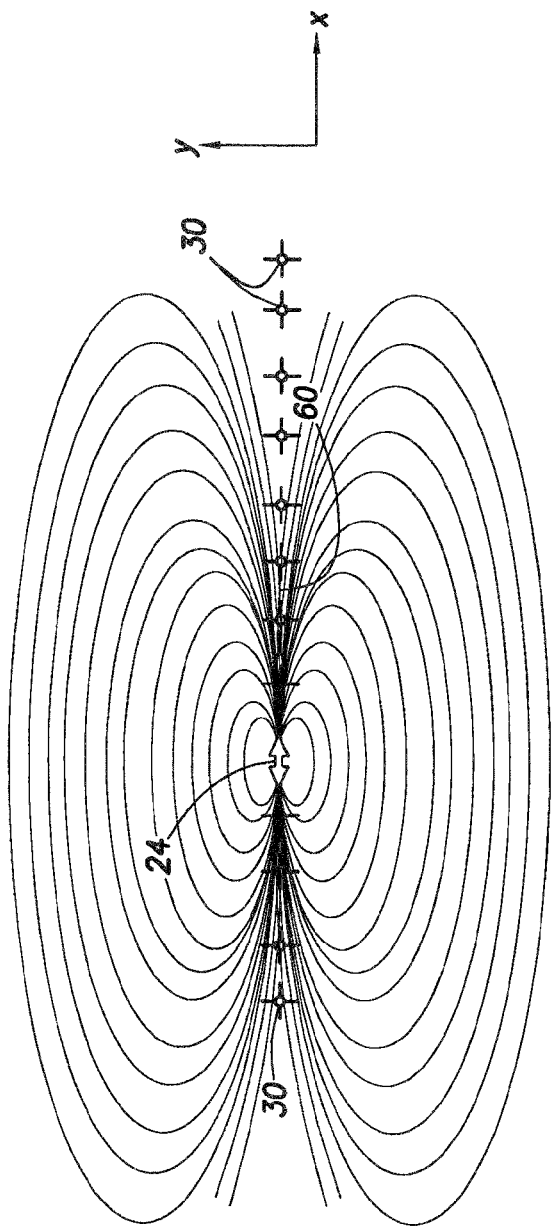
FIG. 3 is an illustration of the relative orientations of an electric dipole source and receivers for an inline measurement configuration according to an embodiment of the invention.
Figure 4:
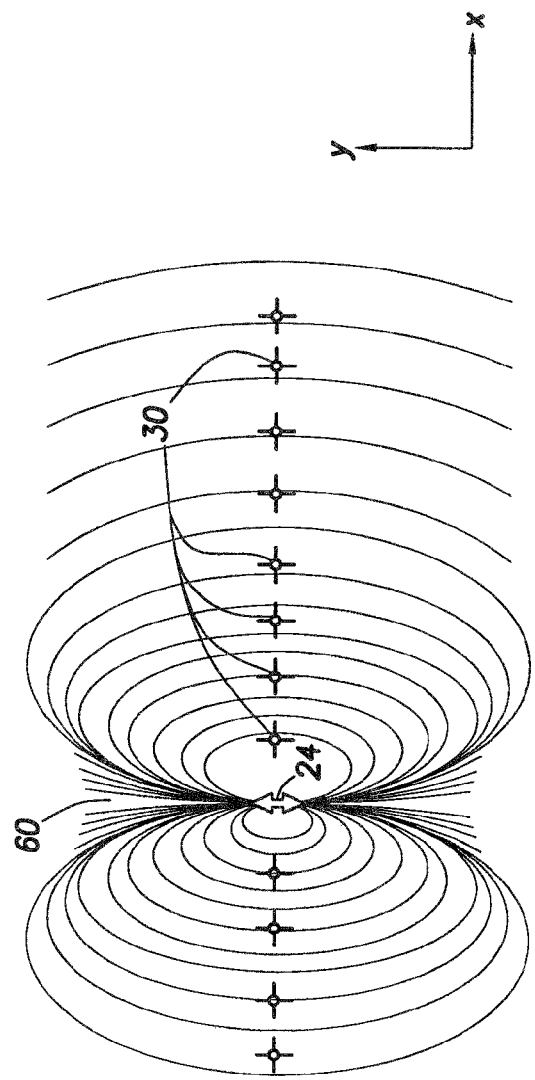
FIG. 4 is an illustration of the relative orientations of an electric dipole source and receivers for a crossline measurement configuration according to an embodiment of the invention.

FIG. 3 depicts the relative orientations of the electric dipole 24 and the receivers 30 for the inline survey configuration in accordance with some embodiments of the invention. As depicted in FIG. 3, a main flux path 60 of the electric dipole 24 extends along the longitudinal axis of the electric dipole 24 and is aligned with the linear configuration of the receivers 30 for the inline configuration. Conversely, for the crossline survey configuration, the main flux path 60 is generally orthogonal to the line along which the receivers 30 extend, as depicted in FIG. 4.

Turning now to the more specific details, the inline survey configuration measures a lateral wave $L_{il}$, which has the following form:

$$L_{il} = \frac{me^{-k_{sw}(\lambda+k)}}{2\pi\sigma_{sw}R^3}, \quad \text{Eq. 2}$$

where "m" represents the moment of the source, which for an electric dipole is given as the applied current times the length of the source; and "$k_{sw}$" represents the propagation constant or wave number for sea water, as set forth below:

$$k_{sw} = \sqrt{2\pi i f \mu \sigma_{sw}} \quad \text{Eq. 3}$$

In Eq. 3, the notation "i" represents the square root of negative one ($\sqrt{-1}$), "f" represents the frequency of operation and "$\mu$" represents the magnetic permeability of the medium, which is assumed to be that of free space ($\mu=\mu_0=4\pi\times10^7$ H/m).

The crossline configuration measures a lateral wave $L_{cl}$, which may be expressed as follows:

$$L_{cl} = \frac{me^{-k_{sw}(\lambda+k)}}{\pi\sigma_{sw}R^3}. \quad \text{Eq. 4}$$

It is noted that Eqs. 2, 3 and 4 depict the lateral waves $L_{il}$ and $L_{cl}$ when electric fields are measured. However, magnetic fields may also be measured and processed in a similar manner, in accordance with other embodiments of the invention.

As can be seen from comparing Eq. 2 to 4, the crossline lateral wave $L_{cl}$ is twice as large as the inline lateral wave $L_{il}$. This result, coupled with the fact that the inline configuration is sensitive to thin resistive bodies while the crossline configuration is not, gives rise to the result that the reservoir response may be enhanced by multiplying the measured inline response by two and subtracting off the measured broadside response. Thus, the resultant electromagnetic field, called "$E_{DIFF}$" below, may be derived as follows:

$$E_{DIFF} = 2E_{IL} - E_{CL}, \quad \text{Eq. 5}$$

where "$E_{IL}$" represents the measured inline electric field, and "$E_{CL}$" represents the measured crossline electric field. Therefore, the computed $E_{DIFF}$ electromagnetic field magnitude may be used as an indicator for resistive bodies, such as oil reservoirs, gas reservoirs and high quality fresh water aquifers, as just a few examples.

Referring to FIG. 5, to summarize, in accordance with some embodiments of the invention, a CSEM survey-based technique 100 may generally be used to produce electric field data, which is sensitive to resistive bodies and relatively desensitive to the air wave effect. Pursuant to the technique 100, inline CSEM survey measurements are performed (block 102) to obtain inline electric field measurements and crossline CSEM survey measurements are also performed (block 104) to obtain crossline electric field measurements.

The crossline electric field measurements are then subtracted (block 106) from the inline electric field measurements (after the inline electric field measurements are multiplied by two) to generate a calculated electric field that is not generally not sensitive to the air wave effect.

The technique 100 is relatively more accurate if the two data sets with different polarizations are obtained such that the measurements occupy the same position simultaneously. However, if the two data sets are collected at different times, then the technique 100 may be susceptible to positioning errors. Orientation uncertainties in both the source and the receiver may introduce additional error.

One technique for reducing the errors attributable to positioning and rotation is to calculate the impedance, which is defined as the ratio between orthogonal components of the measured electric and magnetic fields. Assuming the orientations for the y and x axes, which are depicted in FIGS. 3 and 4, an inline impedance $Z_{il}$ may be described as follows:

$$Z_{il}=E_x/H_y, \qquad \text{Eq. 6}$$

where "$E_x$" represents the component of the electric field, which was measured in the x direction in the inline survey configuration; and "$H_y$" represents the magnitude of the magnetic field in the y direction, which was obtained in the inline survey configuration.

A crossline impedance $Z_{cl}$ may be described as follows:

$$Z_{cl}=E_y/H_x, \qquad \text{Eq. 7}$$

wherein "$E_y$" represents the y component of the electric field measured in the crossline survey configuration; and "$H_x$" represents the x component of the magnetic field measured in the crossline survey configuration.

Positioning errors may further be minimized by rotating the electric and magnetic field data prior to calculation of the impedance to the minimum and maximum of the polarization ellipses.

After the $Z_{il}$ and $Z_{cl}$ impedances are calculated, a difference impedance (called "$Z_{DIFF}$") may be computed as follows:

$$Z_{DIFF}=Z_{il}-Z_{cl}, \qquad \text{Eq. 8}$$

Note that in the impedance calculation, the factor of two is dropped out due to the normalization effect of the impedance. The $Z_{DIFF}$ impedance may thus be used as an indicator of a resistive body.

Figure 6:
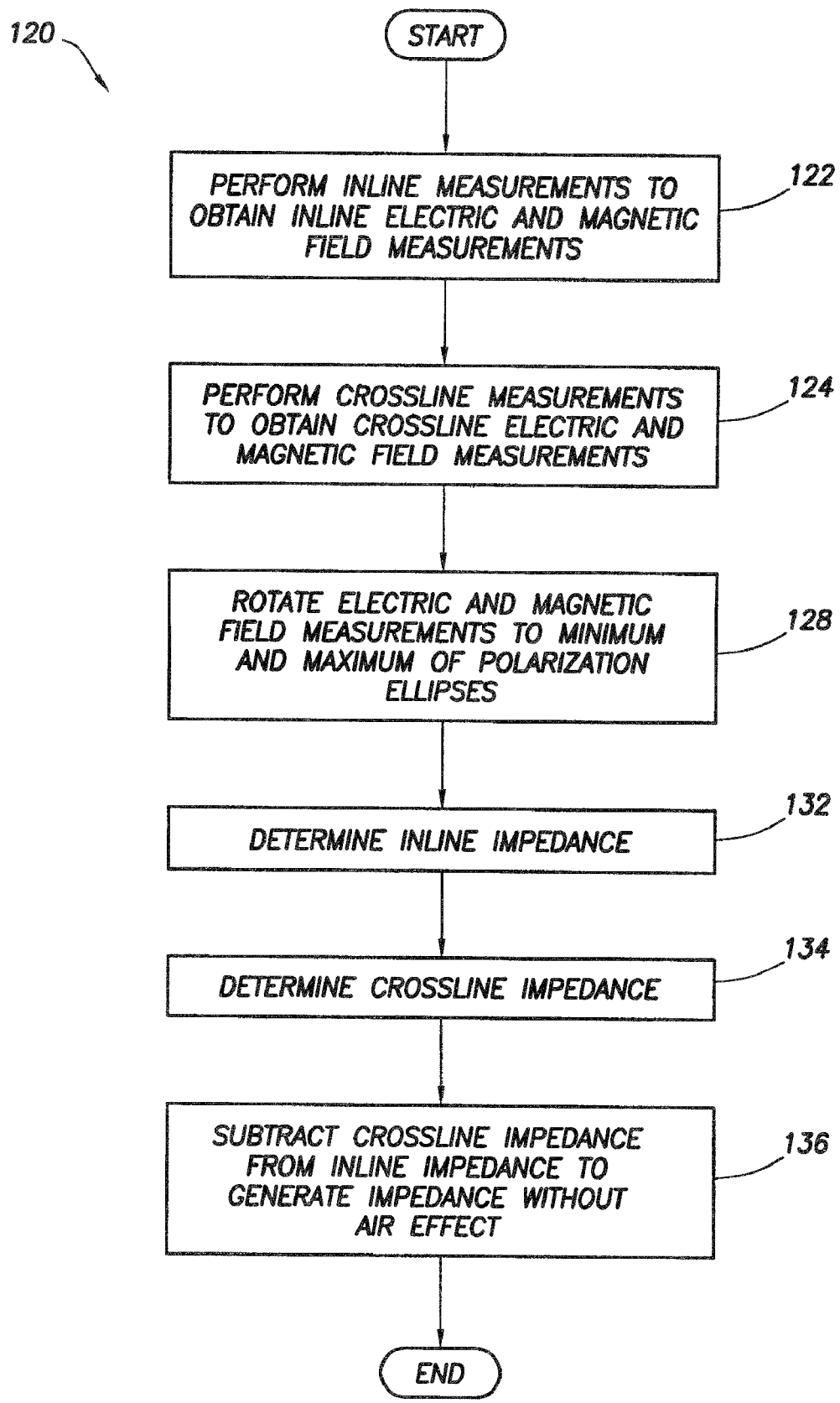

Referring to FIG. 6, to summarize, a technique 120 that is based on impedances may be used to detect a resistive body. Pursuant to the technique 120, inline measurements are made to obtain inline electric and magnetic field measurements, pursuant to block 122. Next, crossline measurements are performed (block 124) to obtain crossline electric and magnetic field measurements. The electric and magnetic field measurements may then be rotated, pursuant to block 128, to the minimum and maximum of the polarization ellipses. The inline (block 132) and the crossline (block 134) impedances are then determined. Subsequently, the crossline impedances may be subtracted from the inline impedance to generate an impedance that is not subject to the air effect, pursuant to block 136.

For terrestrial cases in which the both the source and receivers are on the land surface, z is equal to h is equal to zero (see FIG. 1). Under these conditions, if it is assumed that both the source and the receiver are located just below the surface, then the inline and crossline impedance equations reduce to the following:

$$L_{ii} = \frac{m}{2\pi\sigma_{kind}R^3}; \text{ and} \qquad \text{Eq. 9}$$

$$L_{ci} = \frac{m}{\pi\sigma_{land}R^3}. \qquad \text{Eq. 10}$$

In the terrestrial case, although the signal reduction is entirely due to geometrical falloff, the same factor of two differences between the two polarizations exists. Thus, the differencing methods that are described above also may be used for land-based measurements.

A simulation was conducted in a simulated marine environments for purposes of demonstrating the techniques described herein. In particular, a marine model, the specifics which are described in the table of FIG. 7, includes a thirty meter water layer of electrical resistivity of 0.33 ohm-m, which overlays a half space of electrical resistivity of 0.7 ohm-m. This constitutes the "background" model. The "reservoir," or resistor, model includes a 100 meter thick resistive layer of 20 ohm-m, a depth of 2000 m below the seabed.

In the simulation, the data was simulated for a horizontal electrical dipole source of unit moment aligned in the x and y directions operating at a frequency of 0.1 Hz, located 15 meters above the seabed. Measurements of the horizontal electric and magnetic fields were taken every 500 meters along the x axis from 500 meters to 15,000 meters relative to the source.

Figure 8:
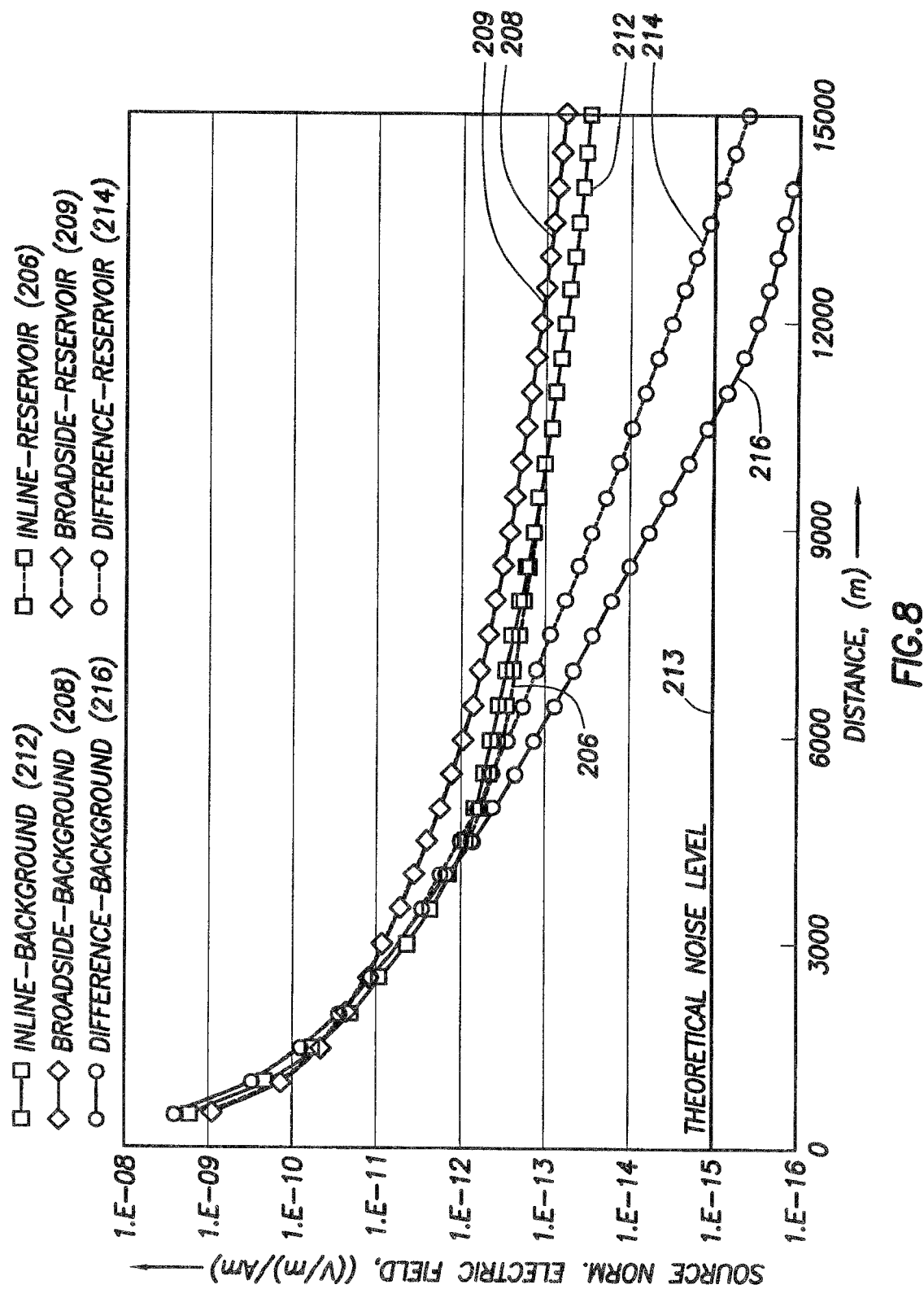
FIG. 8 depicts electric fields obtained in connection with the survey summarized in FIG. 7 according to an embodiment of the invention.

FIG. 8 depicts the horizontal electric fields that were obtained using the model and the techniques described herein. In particular, FIG. 8 depicts a plot 212 of the background electric field, a plot 208 of the crossline electric field of the background and a plot 216 of the difference between the inline and crossline backgrounds. FIG. 8 also depicts a plot 206 of the measured inline electric field of the reservoir and a plot 209 of the measured crossline reservoir electric field. Additionally, FIG. 8 depicts a plot 214, which shows a difference between the inline 206 and crossline 209 plots.

The crossline results show no discernable difference between the background and reservoir models; and the inline results demonstrate only a small difference that would be difficult to detect in field data. However, the computed differences for the two models show large variations between each other. In addition, these differences are well above a theoretical noise level 215 and thus, should be measurable.

Figure 9:
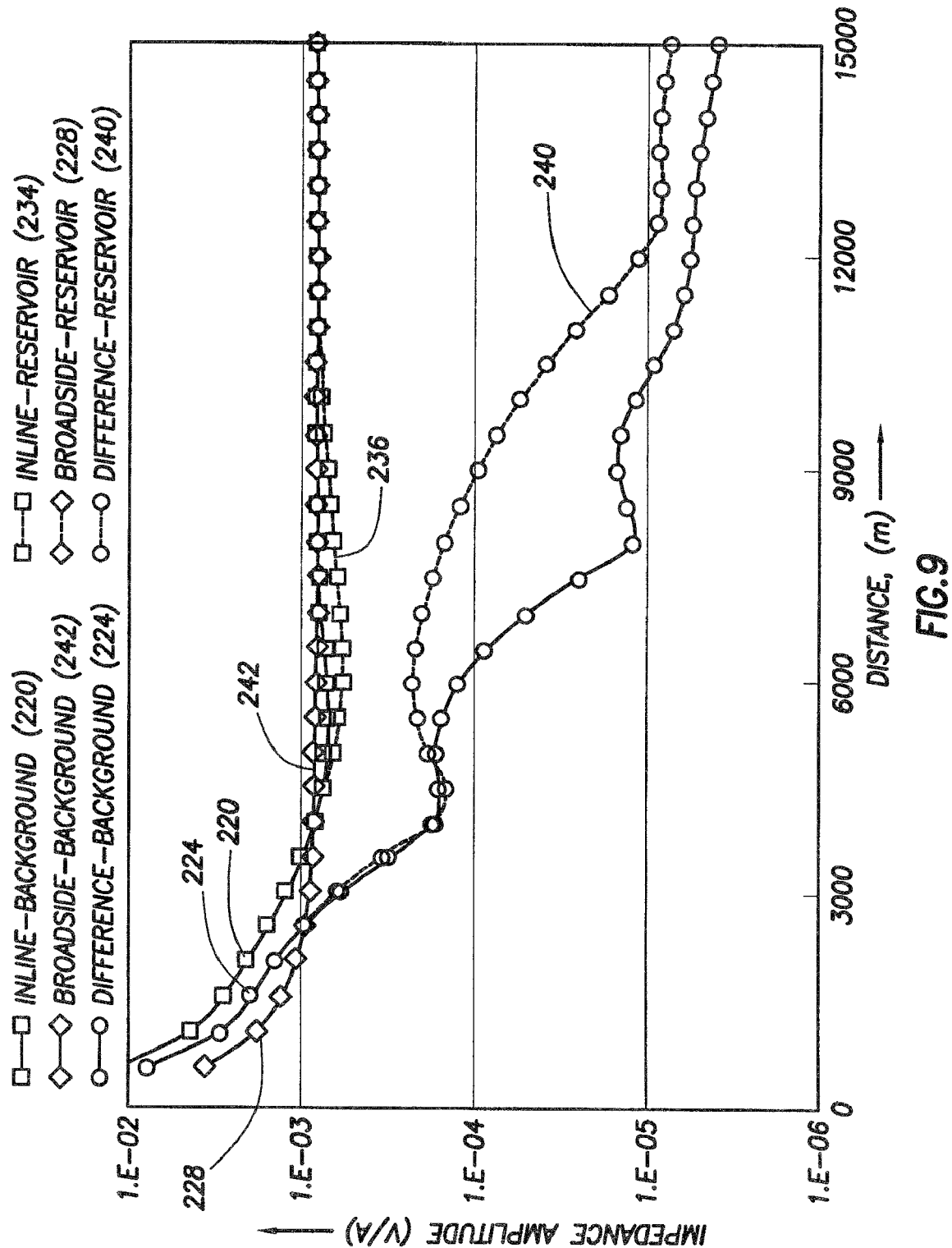
FIG. 9 depicts impedances obtained in connection with the survey summarized in FIG. 7 according to an embodiment of the invention.

FIG. 9 depicts results if impedances are employed. In particular, FIG. 9 depicts a plot 220 of the inline background impedance, a plot 242 of the crossline background impedance and a plot 224 of the difference in the inline and crossline background impedances. FIG. 9 also depicts a plot 236 of the inline reservoir impedances, a plot 228 of the crossline reservoir impedances and a difference between the inline and crossline reservoir impedances. It is noted that the dynamic range of this plot is much smaller than that of the electric fields of FIG. 8, as taking the ratio of the electric and magnetic fields normalizes out the effects of geometrical decay and electromagnetic attenuation. Thus, errors due to positioning are minimized. As also noted that there are substantial differences that are within the range of measurability.

FIG. 10 depicts a table, which summarizes the parameters for a terrestrial model. In particular, for this model, the model employed a half space of the electrical resistivity of 5 ohm-m, which serves as the background. The reservoir model includes a 100 meter thick resistive layer of 100 ohm-m at a depth of 2000 meter below the earth's surface. Data was simulated for a horizontal electrical dipole source of unit moment aligned in the x and y directions operating at a frequency of 0.8 Hz. Measurements of the horizontal electric and magnetic fields were taken every 500 meters along the x axis from 500 meters to 15,000 meters relative to the source.

FIG. 11 depicts a plot 300 of the inline background electric field, a plot 302 of the crossline background electric field and a plot 304 illustrating the differences between the inline 300 and crossline 302 plots. Additionally, FIG. 11 depicts a plot 312 of the inline reservoir electric field, a plot 314 of the crossline reservoir electric field and a plot 316 of the difference between the two plots 312 and 314. As depicted in FIG. 11, taking the differences of the electric fields accentuates the response caused by the presence of the reservoir.

FIG. 12 depicts for the terrestrial model a plot 320 of the inline background impedance, a plot 322 of the crossline background impedance and a plot 324 of the difference between the inline 320 and crossline 322 plots. FIG. 12 also depicts a plot 328 of the inline reservoir impedance, a plot 330 of the crossline reservoir impedance and a plot 340 of the difference between the inline 328 and crossline 330 impedances. Once again, the differences between the impedances generated by the two different source polarizations accentuate the response of the reservoir.

Figure 13:
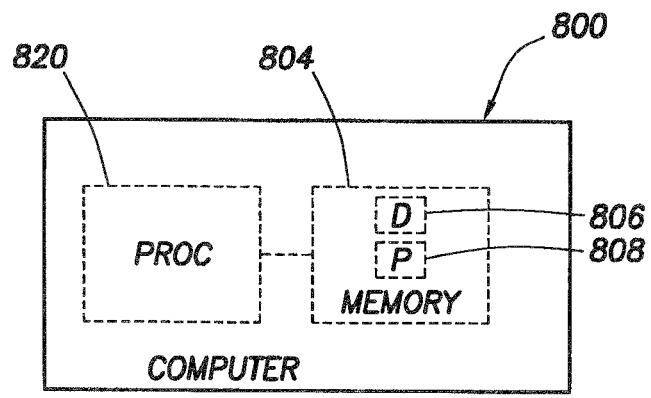
FIG. 13 depicts a computer according to an embodiment of the invention.

Referring to FIG. 13, in accordance with some embodiments of the invention, a computer 800 may be used for purposes of determining the above-described electric fields, magnetic fields, impedances, rotating the electric and magnetic fields, displaying plots of the electric fields and/or impedances, etc., depending on the particular embodiment of the invention. The computer 800 may include, for example, a processor 820 (one or more microprocessors or controllers, as examples) that is coupled to a memory 804 of the computer 800. The memory 804 may be formed partially by semiconductor memory, mass storage, etc., depending on the particular embodiment of the invention. The memory 804 stores program instructions 808 that when executed by the processor 820 causes the computer 800 to perform one or more of the functions that are enumerated above. In addition, the memory 804 may include data 806, such as electric field data, magnetic field data, impedances, etc., depending on the particular embodiment of the invention.

Other embodiments are within the scope of the appended claims. For example, in accordance with some embodiments of the invention, the above-described survey data processing techniques (such as the techniques 40, 100 and 120, which are depicted in FIGS. 2, 5 and 6) may be used in conjunction with deep water (i.e., a water depth in the range of one to three kilometers, for example) surveying, where the source and receivers have relatively large offsets (offsets in the five to fifteen kilometer range, as an example), which may cause the surveying data to be significantly influenced by the air wave effect. As can be appreciated by one skilled in the art, the influence of the air wave effect on the survey data (before processing in accordance with one of the data processing techniques described herein) depends on a number of factors such as the source-to-receiver offset, the resistivity of the sea bed, the frequency of the electromagnetic energy, used in the surveying, etc.

While the present invention has been described with respect to a limited number of embodiments, those skilled in the art, having the benefit of this disclosure, will appreciate numerous modifications and variations therefrom. It is intended that the appended claims cover all such modifications and variations as fall within the true spirit and scope of this present invention.

What is claimed is:

1. A method comprising:
performing first electromagnetic field measurements to obtain a first set of data, the first data being relatively sensitive to an effect caused by an air layer boundary and being relatively insensitive to the presence of a resistive body;
performing second electromagnetic field measurements to obtain a second set of data, the second set of data being relatively sensitive to the effect and being relatively sensitive to the presence of the resistive body; and
combining the first set of data and the second set of data to generate a third set of data being relatively insensitive to the effect and forming an indicator for the presence of the resistive body.

2. The method of claim 1, wherein
the first set of data indicates a first electric field measurement,
the second set of data indicates a second electric field measurement, and
the act of combining comprises subtracting the first electric field measurement from the second electric field measurement.

3. The method of claim 1, wherein
the first set of data indicates a first magnetic field measurement,
the second set of data indicates a second magnetic field measurement, and
the act of combining comprises subtracting the first magnetic field measurement from the second magnetic field measurement.

4. The method of claim 1, wherein
the act of performing the first electromagnetic field measurements comprises using at least one receiver having a polarization approximately orthogonal to a polarization of a transmitter, and
the act of performing the second electromagnetic field measurements comprises using at least one receiver having a polarization approximately aligned with the polarization of the transmitter.

5. The method of claim 1, wherein the act of combining comprises:
generating first impedance measurements from the first set of data;
generating second impedance measurements from the second set of data; and
subtracting the first impedance measurements from the second impedance measurements.

6. The method of claim 5, wherein
the first set of data comprises first electric field data and first magnetic field data, and
the act of generating the first impedance measurements comprises rotating the first electric field data and the first magnetic field data with major and minor polarization axes.

7. The method of claim 6, wherein
the second set of data comprises second electric field data and second magnetic field data, and the act of generating the second impedance measurements comprises rotating the second electric field data and the second magnetic field data with major and minor polarization axes.

8. The method of claim 1, wherein the resistive body comprises a hydrocarbon layer.

9. The method of claim 1, wherein the first layer comprises water.

10. An article comprising a computer readable storage medium accessible by a processor-based system, the storage medium storing instructions that when executed by the processor-based system cause the processor-based system to:

combine a first set of data obtained via first electromagnetic field measurements with a second set of data obtained via second electromagnetic field measurements to obtain a third set of data that is relatively insensitive to an effect caused by an air layer boundary and is relatively sensitive to the presence of a resistive body, wherein the first set of data is relatively insensitive to the presence of the resistive body and sensitive to the effect, and the second set of data is relatively sensitive to the effect and is relatively sensitive to the presence of the resistive body.

11. The article of claim 10, wherein
the first electromagnetic field measurements are conducted using at least one receiver having a polarization approximately orthogonal to a polarization of a transmitter, and
the second electromagnetic field measurements are conducted using at least one receiver having a polarization approximately aligned with the polarization of the transmitter.

12. The article of claim 10, the storage medium storing instructions that when executed cause the processor-based system to:
generate first impedance measurements from the first set of data;
generate second impedance measurements from the second set of data; and
subtract the first impedance measurements from the second impedance measurements to generate an indicator for the presence of the resistive body.

13. The article of claim 10, wherein
the first set of data comprises first electric field data and first magnetic field data, and
the storage medium stores instructions that when executed cause the processor-based system to rotate the first electric field data and the first magnetic field data with major and minor polarization axes.

14. The article of claim 13, wherein
the second set of data of data comprises second electric field data and second magnetic field data, and
the storage medium stores instructions that when executed cause the processor-based system to rotating the second electric field data and the second magnetic field data with major and minor polarization axes.

15. A system comprising:
a processor; and
a memory to store instructions that when executed cause the processor to combine a first set of data obtained via first electromagnetic field measurements with a second set of data obtained via second electromagnetic field measurements to obtain a third set of data that is relatively insensitive to an effect caused by an air layer boundary and is relatively sensitive to the presence of a resistive body, wherein the first set of data is relatively insensitive to the presence of the resistive body and sensitive to the effect, and the second set of data is relatively sensitive to the effect and is relatively sensitive to the presence of the resistive body.

16. The system of claim 15, wherein
the first electromagnetic field measurements are conducted using at least one receiver having a polarization approximately orthogonal to a polarization of a transmitter, and
the second electromagnetic field measurements are conducted using at least one receiver having a polarization approximately aligned with the polarization of the transmitter.

17. The system of claim 15, wherein the processor is adapted to:
generate first impedance measurements from the first set of data;
generate second impedance measurements from the second set of data; and
subtract the first impedance measurements from the second impedance measurements to generator an indicator for the presence of the resistive body.

18. The system of claim 15, wherein
the first set of data comprises first electric field data and first magnetic field data, and
the processor is adapted to rotate the first electric field data and the first magnetic field data with major and minor polarization axes.

19. The system of claim 15, wherein
the second set of data of data comprises second electric field data and second magnetic field data, and
the processor is adapted to rotate the second electric field data and the second magnetic field data with major and minor polarization axes.

* * * * *

UNITED STATES PATENT AND TRADEMARK OFFICE
CERTIFICATE OF CORRECTION

PATENT NO. : 7,657,391 B2  Page 1 of 1
APPLICATION NO. : 11/457623
DATED : February 2, 2010
INVENTOR(S) : Alumbaugh et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 468 days.

Signed and Sealed this

Twenty-eighth Day of December, 2010

David J. Kappos
*Director of the United States Patent and Trademark Office*